(12) United States Patent
Kim et al.

(10) Patent No.: US 9,198,258 B2
(45) Date of Patent: Nov. 24, 2015

(54) DISPLAY DEVICE

(71) Applicant: LG INNOTEK CO., LTD., Seoul (KR)

(72) Inventors: So Yeon Kim, Seoul (KR); Seung Ryong Park, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 14/360,256

(22) PCT Filed: Nov. 5, 2012

(86) PCT No.: PCT/KR2012/009237
§ 371 (c)(1),
(2) Date: May 22, 2014

(87) PCT Pub. No.: WO2013/077568
PCT Pub. Date: May 30, 2013

(65) Prior Publication Data
US 2014/0319995 A1    Oct. 30, 2014

(30) Foreign Application Priority Data

Nov. 23, 2011   (KR) .................. 10-2011-0122849

(51) Int. Cl.
| | |
|---|---|
| *H01L 51/52* | (2006.01) |
| *H05B 33/02* | (2006.01) |
| *H05B 33/22* | (2006.01) |
| *G02F 1/1335* | (2006.01) |
| *H05B 33/12* | (2006.01) |
| *F21V 8/00* | (2006.01) |
| *G02F 1/1333* | (2006.01) |

(52) U.S. Cl.
CPC .............. *H05B 33/22* (2013.01); *G02B 6/0031* (2013.01); *G02F 1/133512* (2013.01); *G02F 1/133615* (2013.01); *H05B 33/12* (2013.01); *G02F 2001/133388* (2013.01); *G02F 2001/133614* (2013.01)

(58) Field of Classification Search
CPC ...... H05B 33/22; H05B 33/12; G02B 6/0031; G02F 1/133615; G02F 1/133512; G02F 2001/133614; G02F 2001/133388
USPC ......................................................... 313/501
See application file for complete search history.

(56) References Cited

U.S. PATENT DOCUMENTS

| | | | |
|---|---|---|---|
| 2002/0167626 A1 | 11/2002 | Matsuda et al. | ................. 349/65 |
| 2004/0000862 A1 | 1/2004 | Setlur et al. | .................... 313/501 |

(Continued)

FOREIGN PATENT DOCUMENTS

| | | |
|---|---|---|
| CN | 101370903 A | 2/2009 |
| JP | 2000-286454 | 10/2000 |

(Continued)

OTHER PUBLICATIONS

Taiwanese Office Action dated Jun. 20, 2014 issued in Application No. 101142233 (with English Translation).

(Continued)

*Primary Examiner* — Donald Raleigh
(74) *Attorney, Agent, or Firm* — Ked & Associates, LLP

(57) ABSTRACT

Disclosed is a display device. The display device includes: a light source; an optical sheet into which light is incident from the light source; a display panel disposed on the optical sheet and including an effective display region and a non-effective display region around the effective display region; and a light conversion/light-blocking sheet corresponding to the non-effective display region.

16 Claims, 2 Drawing Sheets

(56) References Cited

U.S. PATENT DOCUMENTS

| | | | |
|---|---|---|---|
| 2007/0145383 A1 | 6/2007 | Rho et al. | 257/79 |
| 2008/0084517 A1* | 4/2008 | Itou et al. | 349/62 |
| 2008/0151579 A1* | 6/2008 | Kim | 362/633 |
| 2008/0246388 A1* | 10/2008 | Cheon et al. | 313/501 |
| 2009/0002810 A1* | 1/2009 | Jeon et al. | 359/361 |
| 2009/0034230 A1 | 2/2009 | Lim et al. | |
| 2011/0241538 A1* | 10/2011 | Komoto et al. | 313/501 |
| 2011/0273642 A1 | 11/2011 | Kweon et al. | 349/62 |
| 2011/0291548 A1* | 12/2011 | Nguyen The et al. | 313/501 |

FOREIGN PATENT DOCUMENTS

| | | |
|---|---|---|
| JP | 2004-071167 | 3/2004 |
| JP | 2004-231736 | 8/2004 |
| JP | 2009-524235 | 6/2009 |
| KR | 10-2005-0113486 | 12/2005 |
| TW | I241436 B | 10/2005 |
| TW | 200729559 A | 8/2007 |
| TW | 200807099 A | 2/2008 |
| TW | 201140208 A | 11/2011 |

OTHER PUBLICATIONS

International Search Report issued in related International Application No. PCT/KR2012/009237 dated Mar. 18, 2013.
European Search Report issued in related Application No. 12851807.3 dated Jul. 10, 2015.

* cited by examiner

DISPLAY DEVICE

TECHNICAL FIELD

The embodiment relates to a display device.

BACKGROUND ART

Recently, flat display devices, such as an LCD (liquid crystal display), a PDA (plasma display panel) or an OLED (organic light emitting diode), have been increasingly developed instead of conventional CRTs (cathode ray tubes).

Among them, the LCD includes a liquid crystal display panel having a thin film transistor substrate, a color filter substrate and a liquid crystal injected between the thin film transistor substrate and the color filter substrate. Since the liquid crystal display panel is a non-emissive device, a backlight unit is provided below the thin film transistor substrate to supply light. Transmittance of the light emitted from the backlight unit is adjusted according to the alignment state of the liquid crystal.

The backlight unit is classified into an edge-illumination type backlight unit and a direct-illumination type backlight unit according to the position of a light source. According to the edge-illumination type backlight unit, the light source is located at a side of a light guide plate.

The direct-illumination type backlight unit has been developed as the size of the LCD has become enlarged. According to the direct-illumination type backlight unit, at least one light source is located below the liquid crystal display panel to supply the light over the whole area of the liquid crystal display panel.

When comparing with the edge-illumination type backlight unit, the direct-illumination type backlight unit can employ a large number of light sources so that the high brightness can be achieved. In contrast, the direct-illumination type backlight unit must have thickness larger than thickness of the edge-illumination type backlight unit in order to ensure brightness uniformity.

In order to solve the above problem, a quantum dot bar having a plurality of quantum dots, which can convert blue light into red light or green light, is positioned in front of a blue LED that emits the blue light. Thus, as the blue light is irradiated onto the quantum dot bar, the blue light, the red light and the green light are mixed with each other by the quantum dots distributed in the quantum dot bar and the mixed light is incident into the light guide plate, so that white light is generated.

If the white light is supplied to the light guide plate by using the quantum dot bar, high color reproduction may be realized.

The backlight unit may include an FPCB (flexible printed circuit board) provided at one side of the blue LED, which generates blue light, to supply signals and power to the LED and a bonding member formed under the bottom surface of the FPCB.

The display device capable of displaying various images using the white light supplied to the light guide plate through the quantum dot bar as the blue light is emitted from the blue LED has been extensively used.

The display device employing the quantum dots is disclosed in Korean Unexamined Patent Publication No. 10-2011-0068110.

DISCLOSURE OF INVENTION

Technical Problem

The embodiment provides a display device capable of improving color reproduction and brightness.

Solution to Problem

According to the embodiment, there is provided a display device including: a light source; an optical sheet into which light is incident from the light source; a display panel disposed on the optical sheet and including an effective display region and a non-effective display region around the effective display region; and a light conversion/light-blocking sheet corresponding to the non-effective display region.

Advantageous Effects of Invention

The display device according to the embodiment includes a light conversion/light-blocking sheet. The light conversion/light-blocking sheet can reflect incident light while converting the incident light. That is, the light conversion/light-blocking sheet can reflect the incident light in the downward direction by converting the wavelength of the incident light while blocking the incident light.

In particular, the light conversion/light-blocking sheet corresponds to an outer peripheral portion of the optical sheet. Accordingly, the light conversion/light-blocking sheet can block and reflect blue light leaked to the outer peripheral portions of the optical sheets, and convert the blue light into white light at the same time.

Thus, the display device according to the embodiment can block, convert, and reflect light leaked from an outer peripheral portion region to introduce the light into an effective display region of the display panel.

Thus, the display device according to the embodiment may have improved color reproduction and brightness.

MODE FOR THE INVENTION

Figure 1:
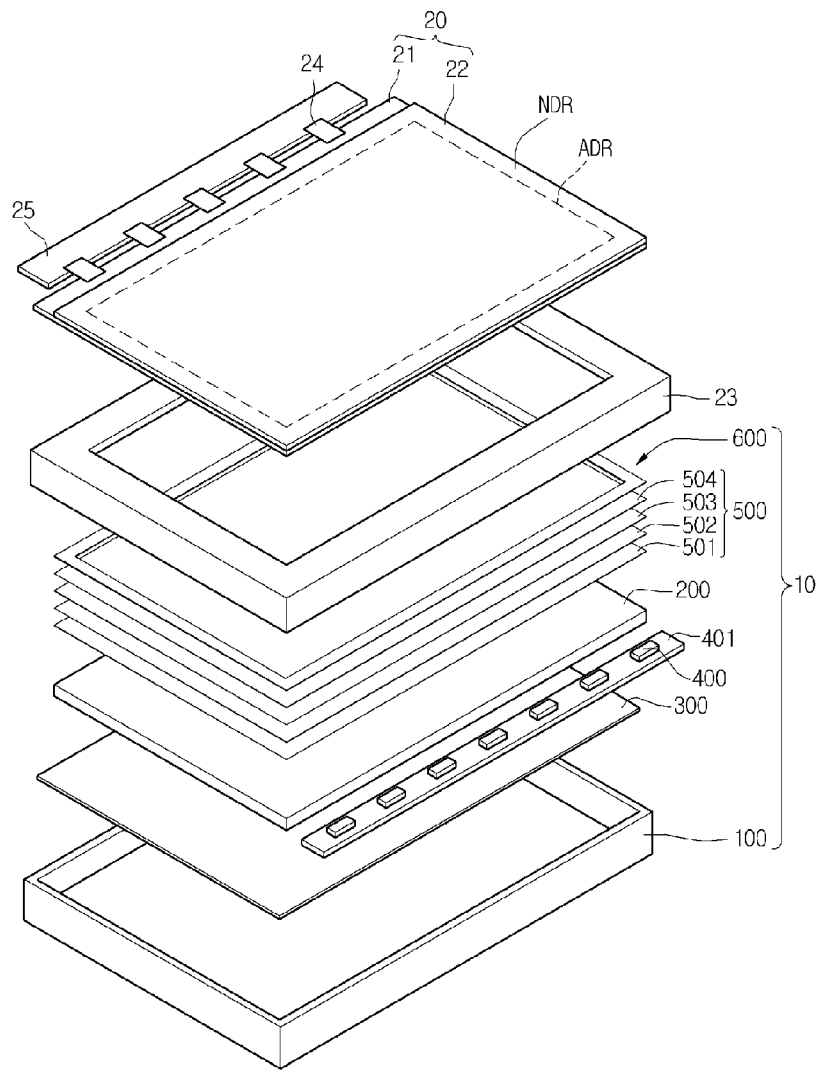
FIG. 1 is an exploded perspective view showing a liquid crystal display device according to an embodiment of the present invention.

In the description of the embodiments, it will be understood that when a substrate, a frame, a sheet, a layer or a pattern is referred to as being "on" or "under" another substrate, another frame, another sheet, another layer or another pattern, it may be "directly" or "indirectly" on the other substrate, the other frame, the other sheet, the other layer or the other pattern, or one or more intervening layers may also be present. Such a position of the layer has been described with reference to the drawings. The size of the elements shown in the drawings may be exaggerated for the purpose of explanation and may not utterly reflect the actual size.

Figure 2:
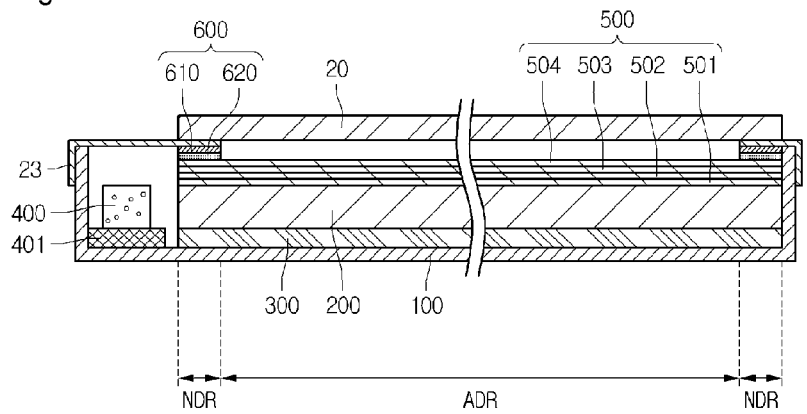
FIG. 2 is a sectional view showing one section of the liquid crystal display device according to the embodiment of the present invention.
Figure 3:
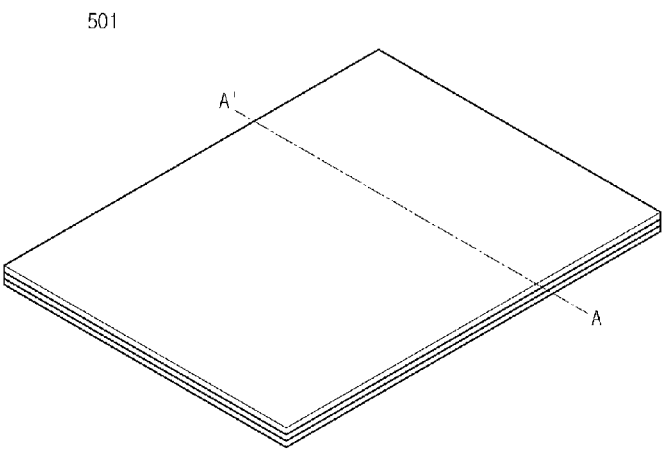
FIG. 3 is a perspective view showing a light conversion sheet.
Figure 4:
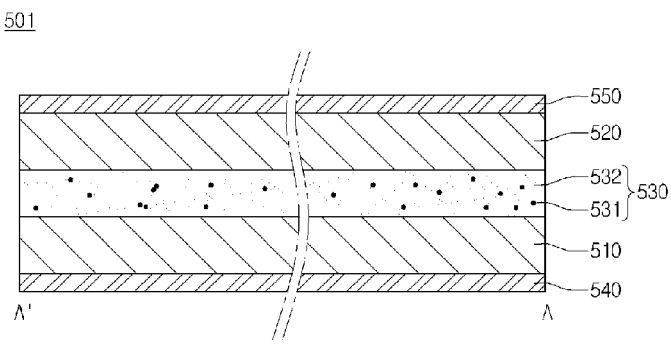
FIG. 4 is a sectional view taken along line A-A' of FIG. 3.
Figure 5:
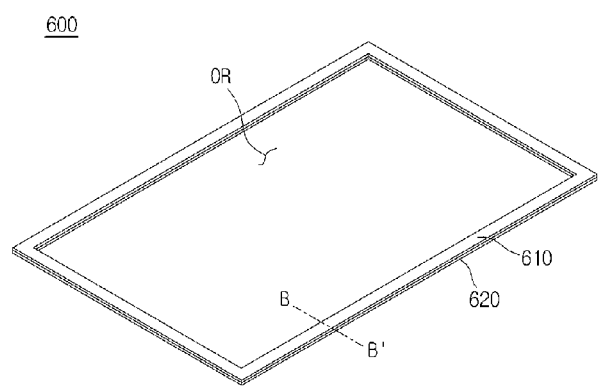
FIG. 5 is a perspective view showing a light conversion/light-blocking sheet.
Figure 6:
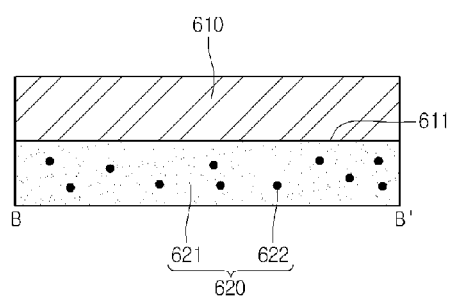
FIG. 6 is a sectional view taken along line B-B' of FIG. 5.

FIG. 1 is an exploded perspective view showing a liquid crystal display device according to an embodiment of the present invention. FIG. 2 is a sectional view showing one section of the liquid crystal display device according to the embodiment of the present invention. FIG. 3 is a perspective view showing a light conversion sheet. FIG. 4 is a sectional view taken along line A-A' of FIG. 3. FIG. 5 is a perspective view showing a light conversion/light-blocking sheet. FIG. 6 is a sectional view taken along line B-B' of FIG. 5.

Referring to FIGS. 1 to 6, the liquid crystal display device according to the embodiment includes a backlight unit 10 and a liquid crystal panel 20.

The backlight unit 10 irradiates light to the liquid crystal panel 20. The backlight unit 10 is a surface light source and may uniformly irradiate light to a lower surface of the liquid crystal panel 20.

The backlight unit 11 is disposed under the liquid crystal panel 20. The backlight unit 10 includes a bottom cover 100, a light guide plate 200, a reflective sheet 300, a plurality of light emitting diodes 400, a printed circuit board 401, a plurality of optical sheets 500, and a light conversion/light-blocking sheet 600.

An upper portion of the bottom cover 100 is open. The bottom cover 100 receives the light guide plate 200, the light emitting diodes 400, the printed circuit board 401, the reflective sheet 300, and the optical sheets 500 therein.

The light guide plate 200 is disposed within the bottom cover 100. The light guide plate 200 is disposed on the reflective sheet 300. The light guide plate 200 irradiates light incident from the light emitting diodes 400 to an upper side through total reflection, refraction, and scattering.

The reflective sheet 300 is disposed under the light guide plate. In more detail, the reflective sheet 300 is disposed between the light guide plate 200 and a bottom surface of the bottom cover 100. The reflective sheet 300 reflects light exiting from a lower surface of the light guide plate 200 to an upper side.

The light emitting diodes 400 are light sources for generating light. The light emitting diodes 400 are disposed on one side surface of the light guide plate 200. The light emitting diodes 400 generate light to introduce the light into the light guide plate 200 through a side surface of the light guide plate 200.

The light emitting diodes 400 may be blue light emitting diodes for generating blue light or UV light emitting diodes for generating ultraviolet rays. That is, the light emitting diodes 400 may generate blue light having a wavelength ranging from approximately 430 nm to approximately 470 nm or ultraviolet ray having a wavelength ranging from approximately 300 nm to approximately 400 nm.

The light emitting diodes 400 is mounted to the printed circuit board 401. The light emitting diodes 400 may be disposed under the printed circuit board 401. The light emitting diodes 400 is driven by receiving a driving signal through the printed circuit board 401.

The printed circuit board 401 is electrically connected to the light emitting diodes 400. The light emitting diodes 400 may be mounted to the printed circuit board 401. The printed circuit board 401 is disposed inside the bottom cover 100.

The optical sheets 500 are disposed on the light guide plate 200. The optical sheets 500 change or improve the characteristics of light irradiated from an upper surface of the light guide plate 200 and supply the light to the liquid crystal panel 20.

The optical sheets 500 may include a light conversion sheet 501, a diffusion sheet 502, a first prism sheet 503, and a second prism sheet 504.

The light conversion sheet 501 is disposed on the light guide plate 20. In more detail, the light conversion sheet 501 may be interposed between the light guide plate 200 and the diffusion sheet 502. The light conversion sheet 501 may convert wavelength of incident light and supply the converted light upward.

For example, when the light emitting diodes 400 are blue light emitting diodes, the light conversion sheet 501 may convert blue light output upward from the light guide plate 200 into green light and red light. That is, the light conversion sheet 501 may convert a part of the blue light into green light having a wavelength in the range of about 520 nm to about 560 nm, and convert another part of the blue light into red light having a wavelength in the range of about 630 nm to about 660 nm.

When the light emitting diodes 400 are UV light emitting diodes, the light conversion sheet 501 may convert UV ray output from the top surface of the light guide plate 200 into blue light, green light, and red light. The light conversion sheet 501 may convert a part of the UV ray into blue light having a wavelength in the range of about 430 nm to about 470 nm, and convert another part of the UV ray into green light having a wavelength in the range of about 520 nm to about 560 nm, and convert a still another part of the UV ray into red light having a wavelength in the range of about 630 nm to about 660 nm.

Accordingly, light passing through the light conversion sheet 510 which is not converted and light converted by the light conversion sheet 501 form white light. That is, the blue light, the green light, and the red light are combined with each other so that the white light may be incident to the liquid crystal panel 20.

The light conversion sheet 501 corresponds to a light conversion member for converting a wavelength of the incident light. That is, the light conversion sheet 501 is a member for changing the characteristics of the incident light.

As shown in FIGS. 2 to 4, the light conversion sheet 501 includes a lower substrate 510, an upper substrate 520, a light conversion layer 530, a first inorganic protective film 540, and a second inorganic protective film 550.

The lower substrate 510 is disposed under the light conversion layer 530. The lower substrate 510 may be transparent and flexible. The lower substrate 510 may adhere to a lower surface of the light conversion layer 530.

An example of a material used for the lower substrate 510 may include a transparent polymer such as polyethyleneterephthalate (PET).

The upper substrate 520 is disposed on the light conversion layer 530. The upper substrate 520 may be transparent and flexible. The upper substrate 520 may adhere to an upper surface of the light conversion layer 530.

An example of a material used for the upper substrate 520 may include a transparent polymer such as polyethyleneterephthalate (PET).

The light conversion layer 530 is sandwiched between the lower substrate 510 and the upper substrate 520. The lower substrate 510 and the upper substrate 520 support the light conversion layer 530. The lower substrate 510 and the upper substrate 520 protect the light conversion layer 530 from an external physical impact.

The lower substrate 510 and the upper substrate 520 have low oxygen transmission rate and vapor permeability. Accordingly, the lower substrate 510 and the upper substrate 520 may protect the light conversion layer 530 from an external chemical impact such as moisture and/or oxygen.

The light conversion layer 530 is interposed between the lower substrate 510 and the upper substrate 520. The light conversion layer 530 may adhere to an upper surface of the lower substrate 510 as well as a lower surface of the upper substrate 520.

The light conversion layer 530 includes a plurality of first light conversion particles 531 and a first host layer 532.

The first light conversion particles 531 are disposed between the lower substrate 510 and the upper substrate 520. In more detail, the first light conversion particles 531 are uniformly dispersed in the host layer 532, and the first host layer 532 is disposed between the lower substrate 510 and the upper substrate 520.

The first light conversion particles 531 convert a wavelength of light irradiated from the light emitting diodes 400. The first light conversion particles 531 receive light irradiated from the light emitting diodes 400, and convert a wavelength of the light. For example, the first light conversion particles 531 can convert blue light irradiated from the light emitting diodes 400 into green light and red light. That is, some of the first light conversion particles 531 can convert the blue light into green light having a wavelength ranging from approximately 520 nm to approximately 560 nm, and the remaining light conversion particles 531 can convert the blue light into red light having a wavelength ranging from approximately 630 nm to approximately 660 nm.

Alternatively, the first light conversion particles 531 can convert ultraviolet ray irradiated from the light emitting diodes 400 into blue light, green light, and red light. That is, some of the first light conversion particles 531 convert the ultraviolet ray into blue light having a wavelength ranging from approximately 430 nm to approximately 470 nm, and some of the first light conversion particles 531 convert the ultraviolet ray into green light having a wavelength ranging from approximately 520 nm to approximately 560 nm. Further, the remaining first light conversion particles 531 convert the ultraviolet ray into red light having a wavelength ranging from approximately 630 nm to approximately 660 nm.

That is, when the light emitting diodes 400 are blue light emitting diodes for generating blue light, first light conversion particles 531 for converting blue light into green light and red light may be used. Alternatively, when the light emitting diodes 400 are UV light emitting diodes for generating UV ray, first light conversion particles 531 for converting ultraviolet ray into blue light, green light, and red light may be used.

The first light conversion particles 531 may be a plurality of quantum dots (QD). The quantum dots may include a core nano crystal and a shell nano crystal surrounding the core nano crystal. The quantum dots may include an organic ligand bonded to the shell nano crystalline. The quantum dots may include an organic coating layer surrounding the shell nano crystal.

The shell nano crystal may be prepared as at least two layers. The shell nano crystal is formed on a surface of the core nano crystal. The quantum dots may covert a wavelength of light introduced into the core nano crystal into a longer wavelength through the shell nano crystal formed the shell layer, increasing an efficiency of light.

The quantum dots may include at least one of a group-II compound semiconductor, a group-III compound semiconductor, a group-V compound semiconductor, and a group-VI compound semiconductor. In more detail, the core nano-crystals may include CdSe, InGaP, CdTe, CdS, ZnSe, ZnTe, ZnS, HgTe or HgS. In addition, the shell nano-crystals may include CuZnS, CdSe, CdTe, CdS, ZnSe, ZnTe, ZnS, HgTe or HgS. The quantum dot may have a diameter of about 1 nm to about 10 nm.

A wavelength of light emitted from the quantum dots may be regulated according to a size of the quantum dots or a mole ratio of molecular cluster compounds to nano particle precursors in a synthesis process. The organic ligand may include pyridine, mercapto alcohol, thiol, phosphine, and a phosphine oxide. The organic ligand serves to stabilize unstable quantum points after the synthesis. Dangling bonds may be formed at the valence band and the quantum dots may be unstable due to the dangling bonds. However, since one end of the organic ligand is the non-bonding state, the one end of the organic ligand is bonded with the dangling bonds, thereby stabilizing the quantum dots.

In particular, if the size of the quantum dot is smaller than the Bohr radius of an exciton, which consists of an electron and a hole excited by light and electricity, the quantum confinement effect may occur, so that the quantum dot may have the discrete energy level. Thus, the size of the energy gap is changed. In addition, the charges are confined within the quantum dot, so that the light emitting efficiency can be improved.

Different from general fluorescent pigments, the fluorescent a wavelength of the quantum dot may vary depending on the size of the particles. In detail, the light has the shorter a wavelength as the size of the particle is reduced, so that the fluorescent light having the wavelength band of visible ray can be generated by adjusting the size of the particles. In addition, the quantum dot represents the extinction coefficient which is 100 to 1000 times higher than that of the general pigment and has the superior quantum yield as compared with the general pigment, so that strong fluorescent light can be generated.

The quantum dots may be synthesized through a wet chemical process. Here, the wet chemical process is a method of submerging a precursor material in an organic solvent to grow particles, and the quantum dots may be synthesized through the wet chemical process.

The first host layer 532 surrounds the first light conversion particles 531. That is, the first host layer 532 uniformly disperses the first light conversion particles 531 therein. The first host layer 532 may be formed of a polymer. The host first host layer 532 is transparent. That is, the first host layer 532 may be formed of a transparent polymer.

The first host layer 532 is disposed between the lower substrate 510 and the upper substrate 520. The first host layer 532 may be attached to an upper surface of the lower substrate 510 and a lower surface of the upper substrate 520.

The first inorganic protective film 540 is disposed under the light conversion layer 530. In more detail, the first organic protective film 540 may be disposed under the lower substrate 510. In more detail, the first organic protective film 540 may be coated on a lower surface of the lower substrate 510.

The first inorganic protective film 540 may protect the light conversion layer 530 together with the lower substrate 510. That is, the first inorganic protective film 540 may protect the light conversion layer 530 from an external physical impact. Further, the first inorganic protective film 540 may prevent oxygen and/or moisture from penetrating into the light conversion layer 530.

The first inorganic protective layer 540 may have a refractive index lower than that of the lower substrate 510. For example, a refractive index of the first inorganic protective film 540 may be approximately 1.3 to 1.6.

Accordingly, the first inorganic protective film 540 may perform an optically buffering function between the lower substrate 510 and a capping part 560, thereby reducing reflection on a lower surface of the lower substrate 510.

An example of a material used for the first inorganic protective film 540 may include silicon oxide or silicon nitride.

The second inorganic protective film 550 is disposed on the light conversion layer 530. In more detail, the second inorganic protective film 550 may be disposed on the upper substrate 520. In more detail, the second inorganic protective film 550 may be coated on an upper surface of the upper substrate 520.

The second inorganic protective film 550 may protect the light conversion layer 530 together with the upper substrate 520. That is, the second inorganic protective film 550 may protect the light conversion layer 530 from an external physical impact. Further, the second inorganic protective film 550 may prevent oxygen and/or moisture from penetrating into the light conversion layer 530.

The second inorganic protective film 550 may have a refractive index lower than that of the upper substrate 520. For example, a refractive index of the second inorganic protective film 550 may be approximately 1.3 to 1.6.

Accordingly, the second inorganic protective film 550 may perform an optically buffering function between the upper substrate 520 and the capping part 560, thereby reducing reflection on an upper surface of the upper substrate 520.

An example of a material used for the second inorganic protective film 550 may include silicon oxide or silicon nitride.

The first inorganic protective film 540 and the second inorganic protective film 550 may perform an optical function such as an anti-reflection function, and seal the light conversion layer 530 to protect the light conversion layer 530 from an external physical and chemical impact.

Referring back to FIG. 1, the diffusion sheet 502 is disposed on the light conversion sheet 501. The diffusion sheet 502 improves the uniformity of the light passing therethrough. The diffusion sheet 502 may include a plurality of beads.

The first prism sheet 503 is disposed on the diffusion sheet 502. The second prism sheet 504 is disposed on the first prism sheet 503. The first prism sheet 503 and the second prism sheet 504 increase straightness of the passing light.

The light conversion/light-blocking sheet 600 is disposed on the optical sheets 500. The light conversion/light-blocking sheet 600 corresponds to outer peripheral portions of the optical sheets 500. That is, the light conversion/light-blocking sheet 600 extends along the outer peripheral portions of the optical sheets 500. Further, the light conversion/light-blocking sheet 600 is disposed to correspond to a non-effective display region (NDR) of the liquid crystal panel 20.

The light conversion/light-blocking sheet 600 is disposed between the liquid crystal panel 20 and the optical sheets 500. In more detail, the light conversion/light-blocking sheet 600 is disposed between the liquid crystal panel 20 and the second prism sheet. Further, the light conversion/light-blocking sheet 600 corresponds to an outer peripheral portion of the liquid crystal panel 20. That is, the light conversion/light-blocking sheet 600 extends along an outer peripheral portion of the liquid crystal panel 20.

The light conversion/light-blocking sheet 600 may surround a periphery of an effective display region of the liquid crystal panel 20. That is, the light conversion/light-blocking sheet 600 may include a transmission part (OR) corresponding to an effective display region of the liquid crystal panel 20. The light conversion/light-blocking sheet 600 may have a closed loop shape.

As shown in FIGS. 4 and 5, the light conversion/light-blocking sheet 600 includes a light blocking part 610 and a light conversion part 620.

The light blocking part 610 blocks incident light. In more detail, the light blocking part 610 can block light introduced to an upper side, and reflect the light to a lower side. In more detail, the light blocking part 610 can reflect the light incident through the light conversion part 620.

The light blocking part 610 may be formed of a material having a high reflectivity. For example, the light blocking part 610 may contain a metal, such as silver or aluminum, or white ink. Accordingly, the light blocking part 610 includes a reflective surface 611 to reflect light incident from the outside. The reflective surface 611 directly faces the light conversion part 620. In more detail, the reflective surface 611 may directly contact the light conversion part 620. In more detail, an interfacial surface between the light blocking part 610 and the light conversion part 620 may be the reflective surface 611.

The light conversion part 620 is disposed under the light blocking part 610. The light conversion part 620 is directly disposed on a lower surface of the light blocking part 610. In more detail, the light conversion part 620 is directly disposed on the reflective surface 611 of the light blocking part 610.

The light conversion part 620 converts a wavelength of the incident light. In more detail, the light conversion part 620 can convert a wavelength of blue light, which passes through the optical sheets 500 without being converted, from the light emitting diodes. The light conversion part 620 can convert the blue light passing through the optical sheets 500 into yellow light, red light, and green light.

The light conversion part 620 includes a second host layer 621 and a plurality of second light conversion particles 622.

The second host layer 621 is transparent and is attached to a lower surface of the light blocking part 610. The second host layer 621 is uniformly coated on a lower surface of the light blocking part 610. An example of a material used for the second host layer 621 may include a silicon based resin or an epoxy based resin.

The second light conversion particles 622 are disposed in the second host layer 621. The second light conversion particles 622 are uniformly disposed in the second host layer 621. The second light conversion particles 622 can convert a wavelength of the incident light.

For example, the second light conversion particles 622 can convert the blue light introduced through the optical sheets 500 into yellow light, red light, or yellow light.

The second light conversion particles 622 may include quantum dots or fluorescent bodies. That is, the second light conversion particles 622 may include quantum dots for converting the incident light into green light having a wavelength ranging from approximately 520 nm to approximately 560 nm. Further, the second light conversion particles 622 may include quantum dots for converting the incident light into red light having a wavelength ranging from approximately 630 nm to approximately 660 nm.

Further, the second light conversion particles 622 may include a green phosphor, a red phosphor, or a yellow phosphor.

An example of the green phosphor may include a zinc silicon oxide based phosphor doped with manganese (for example, $Zn_2SiO_4$:Mn), strontium gallium sulfide based phosphor doped with europium (for example, $SrGa_2S_4$:Eu), a barium silicon oxide chloride based phosphor doped with europium (for example, $Ba_5Si_2O_7Cl_4$:Eu).

An example of the red phosphor may include a strontium titanium oxide based phosphor doped with praseodymium or aluminum (for example, $SrTiO_3$:Pr, Al) or a calcium titanium oxide based phosphor doped with praseodymium (for example, $CaTiO_3$:Pr).

An example of the yellow phosphor may include yttrium aluminum garnet (YAG). In particular, when the yellow phosphor is used in the light conversion part 620, an intensity having a wavelength ranging from approximately 555 nm to approximately 560 nm may increase, and white light having an entirely improved brightness may be formed at a part adjacent to the light conversion/light-blocking sheet 600.

Further, the light conversion/light-blocking sheet 600 may further include a protective film disposed on a lower surface of the light conversion part 620.

The liquid crystal panel 20 is disposed on the optical sheets 500. Further, the liquid crystal panel 20 is disposed on a panel guide 23. The liquid crystal panel 20 may be guided by the panel guide 23.

The liquid crystal panel 20 regulates an intensity of passing light to display an image. That is, the liquid crystal panel 20 is a display panel for displaying an image by using light irradiated from the backlight unit 10. The liquid crystal panel 20 includes a TFT substrate 21, a color filter substrate 22, and a liquid crystal layer interposed between the two substrates. Further, the liquid crystal panel 20 includes polarization filters.

The liquid crystal panel 20 includes an effective display region (ADR) where an image is displayed, and a non-effective display region (NDR) surrounding a periphery of the effective display region (ADR). The non-effective display region (NDR) corresponds to the light conversion/light-blocking sheet 600. Pixels for displaying an image are disposed in the effective display region (ADR).

Although not shown in the drawings, in the TFT substrate 21 and the color filter substrate 22, a plurality of gate lines and a plurality of data lines cross each other to define pixels in the TFT substrate 21, and thin film transistors (TFTs) are provided in the respective cross regions to be connected to the pixel electrodes mounted to the pixels in one-to-one correspondence. The color filter substrate 22 includes color filters of R, G, and B colors corresponding to the pixels, a black matrix framing the color filters and covering the gate lines, the data lines, and the thin film transistors, and a common electrode covering the color filters and the black matrix.

A drive PCB 25 for supplying a drive signal to the gate lines and the data lines is disposed at a periphery of the liquid crystal panel 20.

The drive PCB 25 is electrically connected to the liquid crystal panel 20 by chips on film (COFs) 24. Here, the COF 24 may be changed to a tape carrier package (TCP).

As described above, the light conversion/light-blocking sheet 600 reflects incident light while converting the incident light. That is, the light conversion/light-blocking sheet 600 can convert a wavelength of the incident light to a lower side to reflect the incident light while blocking the incident light.

In particular, the light conversion/light-blocking sheet 600 corresponds to the outer peripheral portions of the optical sheets 500. Accordingly, the light conversion/light-blocking sheet 600 can block and reflect blue light leaked to the outer peripheral portions of the optical sheets 500, and convert the blue light into white light at the same time.

Thus, the liquid crystal display device according to the embodiment can block, convert, and reflect the light leaked at the outer peripheral portion region to introduce the light into the effective display region (ADR) of the liquid crystal panel 20.

Therefore, the liquid crystal display device according to the embodiment may have improved color reproduction and brightness.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effects such feature, structure, or characteristic in connection with other ones of the embodiments.

Although embodiments have been described with reference to a number of illustrative embodiments thereof, it should be understood that numerous other modifications and embodiments may be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A display device comprising:
   a light source;
   an optical sheet provided over the light source;
   a display panel provided over the optical sheet and including an effective display region and a non-effective display region around the effective display region that extends around an outer portion of the display panel; and
   a light conversion/light-blocking sheet provided under the display panel and corresponding to the non-effective display region,
   wherein the light conversion/light-blocking sheet is configured to convert a wavelength of light emitted from the light source and reflect the converted light back toward the light source.

2. The display device of claim 1, wherein the light conversion/light-blocking sheet includes:
   a light blocking part disposed between the display panel and the optical sheet; and
   a light conversion part disposed on a lower surface of the light blocking part.

3. The display device of claim 2, wherein the light conversion part has a shape corresponding to a shape of the light blocking part.

4. The display device of claim 2, wherein the light conversion part is directly disposed on a lower surface of the light blocking part.

5. A display device comprising:
   a light source;
   an optical sheet adjacent to the light source;
   a display panel provided adjacent to the optical sheet and including an effective display region and a non-effective display region around the effective display region; and
   a light conversion/light-blocking sheet corresponding to the non-effective display region,
   wherein the light conversion/light-blocking sheet includes:
   a light blocking part disposed between the display panel and the light source, and
   a light conversion part disposed on a lower surface of the light blocking part, and
   wherein the light blocking part includes a reflective surface directly facing the light conversion part.

6. The display device of claim 1, wherein the optical sheet includes a light conversion sheet.

7. The display device of claim 6, wherein the light conversion sheet includes a first host layer and a plurality of first light conversion particles including a semiconductor composition.

8. The display device of claim 7, wherein the first light conversion particles include quantum dots.

9. The display device of claim 2, wherein the light conversion part includes a second host layer and a plurality of second light conversion particles including a semiconductor composition.

10. The display device of claim 9, wherein the second light conversion particles include quantum dots.

11. The display device of claim 2, wherein the light conversion part includes a phosphor.

12. The display device of claim 11, wherein the phosphor includes a yellow phosphor.

13. The display device of claim 11, wherein the phosphor includes a green phosphor, a red phosphor, or a yellow phosphor.

14. The display device of claim 1, wherein the light conversion/light-blocking sheet is disposed between the display panel and the optical sheet.

15. The display device of claim 2, wherein the light blocking part includes a reflective surface directly facing the light conversion part.

16. The display device of claim 15, wherein the reflective surface directly makes contact with the light conversion part.

* * * * *